Oct. 29, 1935.  W. C. GRAVES, JR  2,019,407
PORTABLE COLLAPSIBLE HOTHOUSE
Filed July 29, 1935  2 Sheets-Sheet 1
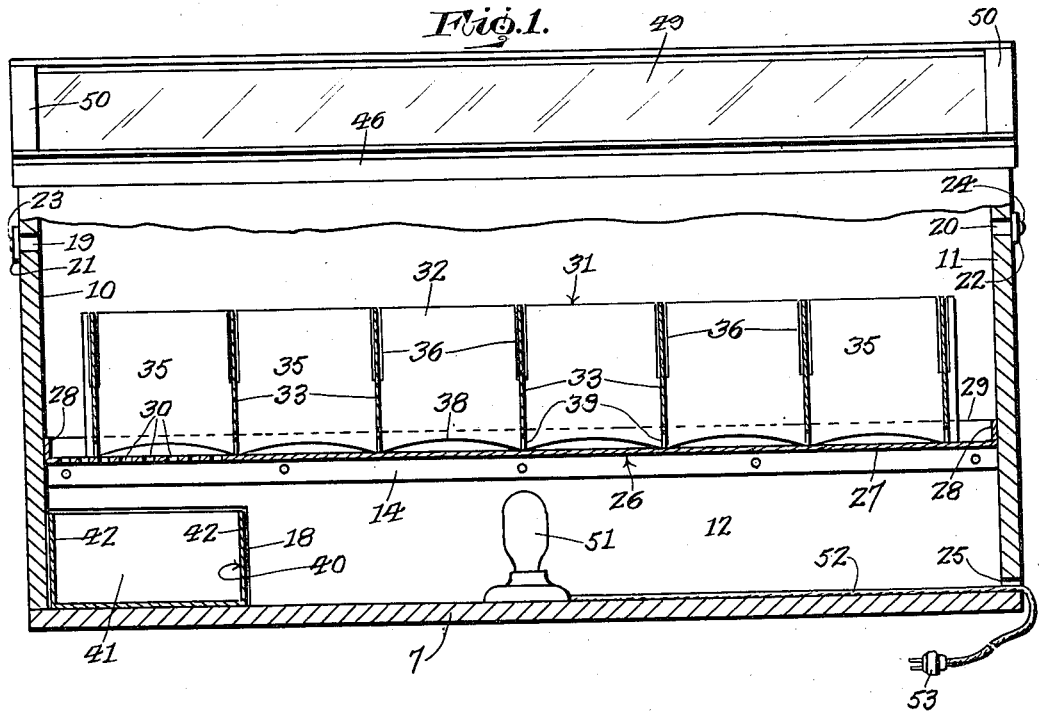
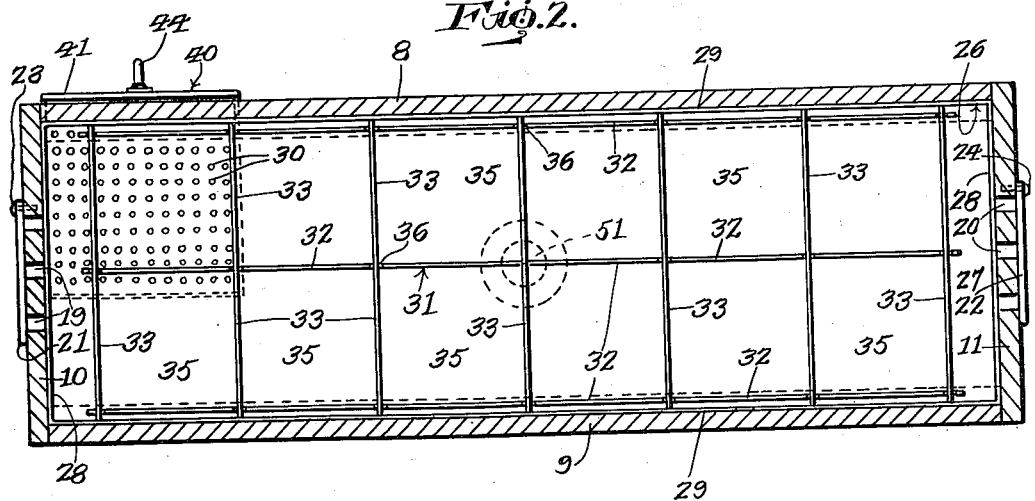
Inventor
*Walker Coleman Graves, Jr.*
By *Geo. P. Kimmel*
Attorney Oct. 29, 1935.  W. C. GRAVES, JR  2,019,407
PORTABLE COLLAPSIBLE HOTHOUSE
Filed July 29, 1935  2 Sheets-Sheet 2
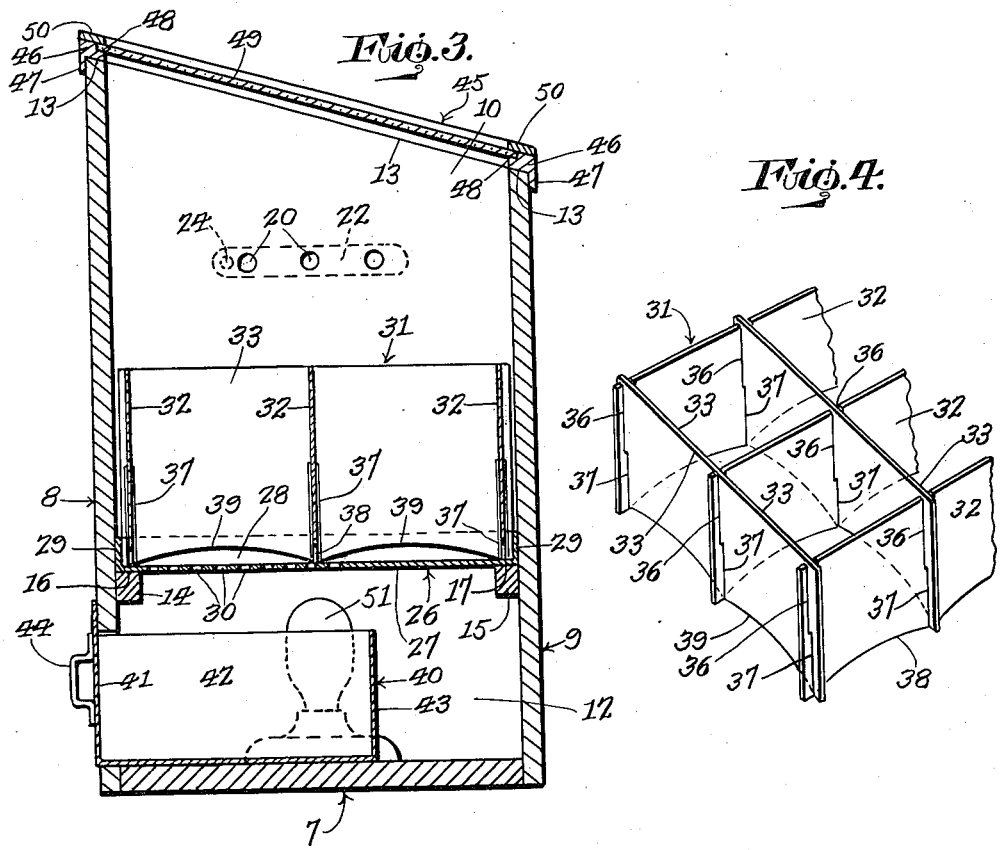
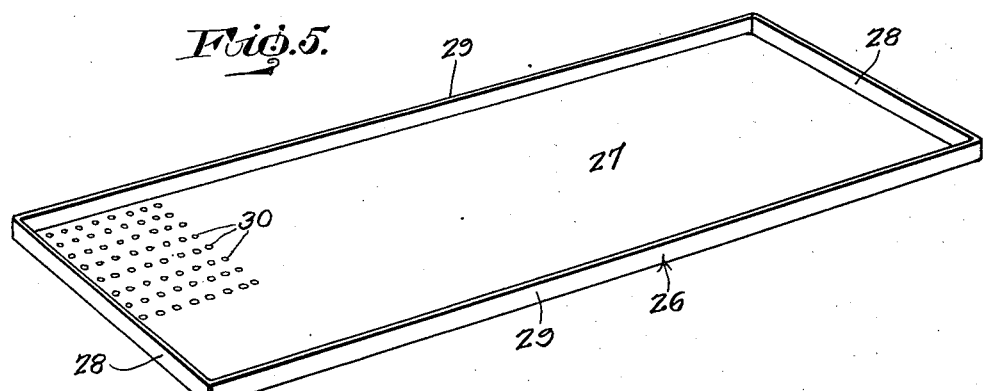
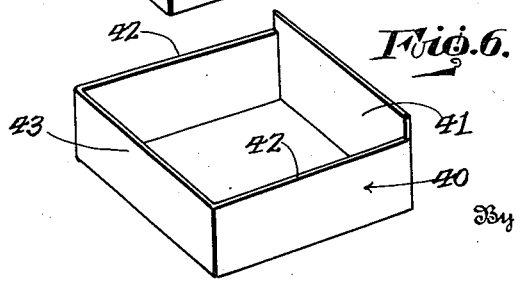
Inventor
Walker Coleman Graves, Jr.
By Geo. P. Kimmel
Attorney Patented Oct. 29, 1935

2,019,407

UNITED STATES PATENT OFFICE 2,019,407

PORTABLE COLLAPSIBLE HOTHOUSE

Walker Coleman Graves, Jr., San Francisco, Calif.

Application July 29, 1935, Serial No. 33,791

5 Claims. (Cl. 47—19).

This invention relates to a portable collapsible hot-house of the electrical type for plant incubation and has for its object to provide in a manner as hereinafter set forth, a portable hot-house for the purpose referred to which is simple in construction, strong, durable, readily assembled and collapsed when occasion requires, thoroughly efficient when used, light in weight, capable of being arranged, when collapsed in a compact manner for shipment and practical for both home gardeners and for school-room instruction.

With the foregoing and other objects which may hereinafter appear, the invention consists of the novel construction, combination and arrangement of parts as will be more specifically referred to and as are illustrated in the accompanying drawings wherein is shown an embodiment of the invention, but it is to be understood that changes, variations and modifications may be resorted to which fall within the scope of the invention as claimed.

In the drawings:

Figure 1 is a front elevation partly in section of the portable collapsible hot-house, Figure 2 is a sectional plan of the hot-house, Figure 3 is a transverse sectional view of the hot-house, Figure 4 is a fragmentary view in perspective of the cellular structure providing independent soil receiving cells, Figure 5 is a perspective view of the support for the cellular structure, and Figure 6 is a perspective view of the water collector.

The portable collapsible hot-house will now be described in a manner in which the elements thereof are arranged relatively to each other when the hot-house is assembled. The hot-house includes a horizontally disposed flat rectangular bottom member 7, an upstanding rear member 8 abutting the rear edge of member 7, an upstanding front member 9 abutting the front edge of member 7, and a pair of upstanding side members 10, 11 abutting the end edges of the members 8, 9 and seated upon and flush with edges of the member 7. The members 7, 8, 9 and 10 are detachably connected together by any suitable means and coact to form an open top chamber 12 for plant incubation. The bottom, rear wall, front wall and side walls of the chamber 12 are provided by the members 7, 8, 9, 10 and 11 respectively. The members 8, 9, 10 and 11 are of rectilinear contour. The member 8 is of greater height than the member 9. The members 10 and 11 at their rear edges correspond in height to the inner face of member 8 and at their front edges correspond in height to the inner face of member 9. The top edges of the members 8, 9, 10 and 11 incline downwardly from rear to front, as at 13 and are flush with each other.

Secured to the inner faces of the members 8, 9 between their lengthwise medians and lower ends are a pair of bars 14, 15 respectively which correspond in length to that of members 8, 9 and have upper squared surfaces providing support ledges 16, 17 for a purpose referred to. The ledges are arranged in alignment.

The member 8 at one end, below the bar 14 is formed with a cutout 18 which coacts with the members 7 and 10 to form a drawer opening for a drawer to be referred to. The members 10, 11 between their transverse medians and upper ends are formed with transversely extending sets 19, 20 respectively of ventilating openings controlled by frictionally latched dampers 21, 22, respectively pivoted to said members 10, 11, as at 23, 24 respectively. The wall 11 is formed with a groove 25 in its lower end for a purpose to be referred to.

Removably mounted upon the ledgs 16, 17 is a rectangular support 26 of pan-like form best shown in Figure 5 and comprising a flat bottom 27, a pair of upstanding end flanges 28, a pair of upstanding side flanges 29 merging into the ends of flanges 28 and a rectangular group of spaced water outlets 30 in the bottom 27. The length of the group is less than the width of bottom 27. The group extends from the rear side and terminates adjacent to the front side of the bottom 27. One side of the group is arranged in close proximity to one end of bottom 27. The width of the group is naturally less than half the length of bottom 27. The flanges 28 of support 26 abut the inner faces of the members 10, 11.

Removably mounted in the support 26, abutting the flanges 29 of the latter and spaced from the flanges 28 is an upstanding open top and bottom cellular structure 31 formed of a plurality of longitudinal spaced parallel metallic strips 32 standing on their lower lengthwise edges and a plurality of horizontal spaced parallel metallic strips 33 standing on their lower lengthwise edges. The strips 32 are of greater length than the strips 33. The number of strips 33 will be greater than the number of strips 32. Preferably the number of strips 32 employed will be three and that of strips 33 seven. The strips 32, 33 removably interengage with each other to provide a series of square soil receiving cells 35 of like area adapted to receive a body of soil in which the seed is planted. The cells 35 are arranged in opposed pairs. The strips 32 have their upper portions formed with equi-spaced vertically extending notches 36 opening at their upper edges. The strips 33 have their lower portions formed with equi-spaced vertically extending notches 37 opening at the lower edges thereof. The notches 36, 37 coact to provide for the removable interengaging of the strips 33, 32 and for connecting them together in a manner to form the open top and bottom cells 35. The bottom edge of each of the strips 32 is formed with convex edge portions 38 merging into each other and of like length. The bottom edge of each of the strips 33 is formed with convex edge portions 39 merging into each other and of like length. The length of edge portions 38 corresponds to that of the edge portions 39. The length of each convex edge portion corresponds to the width and breadth of a cell. The convex edge portions form outlets for the surplus of the water supplied to the soil within a cell. The water is discharged from the cells into the support 26 and passes from the latter through the group of outlets 30. It is understood that the bars may be slightly tilted from member 11 to member 10 to facilitate the passage of the water towards the outlets 30.

Removably extended into the chamber 10 through the opening 18 is a water receiver or collector 40 in the form of an open top drawer which when in receiving position is supported on the upper face of member 7. The receiver 40 has its outer or front wall 41 of greater height than its sides and inner walls 42, 43 respectively. The wall 41 extends above the upper wall of cutout 18. The wall 41 has secured thereto a handle member 44.

A removable closure 45 is provided for the open upper end of chamber 12. The closure 45 consists of a rectangular frame 46 having an endless depending flange 47 and an endless rabbet 48. Seated upon the rabbet 48 and closing frame 46 is a transparent panel 49. Mounted upon the top of frame 46 as well as being secured to the latter is retaining member 50 for panel 49. The member 50 extends upon the front, rear and side marginal portions of the upper face of panel 49. The endless flange 47 abuts the upper ends of the outer faces of the members 8, 9, 10, and 11 to prevent the shifting of the frame relative to said members and also to prevent the members 8, 9, 10 and 11 from spreading apart at their upper ends.

Arranged within the chamber 12 below support 26 is a removable heater in the form of an electric lamp 51 having circuit connections 52 leading thereto. The outer ends of connections 52 are provided with a plug 53. The connections 52 pass through groove 25. The lamp 51 is mounted on member 7.

What I claim is:

1. A portable collapsible hot-house comprising an upstanding rectangular collapsible structure forming an open top chamber for plant incubation, spaced ledges within the chamber and an opening in one of the walls of the chamber, a removable support of pan-like form mounted on said ledges and having water outlets at one end thereof, an upstanding rectangular structure removably mounted in said support and including oppositely disposed interengaging vertically disposed strips forming open top and bottom cells, each for confining therein a body of soil, a removable open top surplus water receiver extending through said opening and positioned below said outlets, a removable transparent closure for the open top of said chamber, and a removable heating element arranged within said chamber below said support.

2. A portable collapsible hot-house comprising an upstanding rectangular collapsible structure forming an open top chamber for plant incubation, spaced ledges within the chamber and an opening in one of the walls of the chamber, a removable support of pan-like form mounted on said ledges and having water outlets at one end thereof, an upstanding rectangular structure removably mounted in said support and including oppositely disposed interengaging vertically disposed strips forming open top and bottom cells, each for confining therein a body of soil, a removable open top surplus water receiver extending through said opening and positioned below said outlets, a removable transparent closure for the open top of said chamber, and a removable heating element arranged within said chamber below said support, and said collapsible structure including controllable ventilating means at each end thereof for said chamber.

3. A portable collapsible hot-house comprising an upstanding rectangular collapsible structure forming an open top chamber for plant incubation, spaced ledges within the chamber and an opening in one of the walls of the chamber, a removable support of pan-like form mounted on said ledges and having water outlets at one end thereof, an upstanding rectangular structure removably mounted in said support and including oppositely disposed interengaging vertically disposed strips forming open top and bottom cells, each for confining therein a body of soil, a removable open top surplus water receiver extending through said opening and positioned below said outlets, a removable transparent closure for the open top of said chamber, and a removable heating element arranged within said chamber below said support, and said closure having a depending endless flange opposing the upper portion of the outer face of said collapsible structure.

4. A portable collapsible hot-house comprising an upstanding rectangular collapsible structure forming an open top chamber for plant incubation, spaced ledges within the chamber and an opening in one of the walls of the chamber, a removable support of pan-like form mounted on said ledges and having water outlets at one end thereof, an upstanding rectangular structure removably mounted in said support and including oppositely disposed interengaging vertically disposed strips forming open top and bottom cells, each for confining therein a body of soil, a removable open top surplus water receiver extending through said opening and positioned below said outlets, a removable transparent closure for the open top of said chamber, and a removable heating element arranged within said chamber below said support, each of said strips being formed with convex edge portions in proximity to said support providing surplus water outlets for said cells.

5. In a hot-house for plant incubation, an open incubation chamber, a transparent closure for said open top, a support arranged above the bottom of the chamber and formed with surplus water outlets, a structure mounted upon said support and being formed to provide open top and bottom cells, each for confining a body of soil, said structure having convex edge portions providing outlets for surplus water from the cells, and a water receiver positioned in said chamber below the outlets in said bottom.

WALKER COLEMAN GRAVES, JR.